US009605432B1

(12) United States Patent
Robbins

(10) Patent No.: US 9,605,432 B1
(45) Date of Patent: Mar. 28, 2017

(54) INTERLOCKING ROOF SHINGLE AND ROOFING SYSTEM

(71) Applicant: Roberto F. Robbins, St. Petersburg, FL (US)

(72) Inventor: Roberto F. Robbins, St. Petersburg, FL (US)

( * ) Notice: Subject to any disclaimer, the term of this patent is extended or adjusted under 35 U.S.C. 154(b) by 0 days.

(21) Appl. No.: 15/134,734

(22) Filed: Apr. 21, 2016

(51) Int. Cl.
| E04D 1/00 | (2006.01) |
| E04D 1/12 | (2006.01) |
| E04D 1/20 | (2006.01) |
| E04D 1/34 | (2006.01) |
| F21Y 101/02 | (2006.01) |
| F21Y 103/00 | (2016.01) |
| F21W 131/10 | (2006.01) |
| F21V 23/06 | (2006.01) |
| F21V 33/00 | (2006.01) |
| F21S 4/28 | (2016.01) |

(52) U.S. Cl.
CPC ............... *E04D 1/12* (2013.01); *E04D 1/20* (2013.01); *E04D 1/34* (2013.01); *F21S 4/28* (2016.01); *F21V 23/06* (2013.01); *F21V 33/006* (2013.01); *F21W 2131/10* (2013.01); *F21Y 2101/02* (2013.01); *F21Y 2103/003* (2013.01)

(58) Field of Classification Search
CPC ............... E04D 1/12; E04D 1/20; E04D 1/34
See application file for complete search history.

(56) References Cited

U.S. PATENT DOCUMENTS

| 2,188,454 | A |  | 1/1940 | Braddock |
| 2,601,833 | A |  | 7/1952 | Olsen |
| 3,347,001 | A |  | 10/1967 | Cosden |
| 3,394,520 | A |  | 7/1968 | Skelton, Jr. |
| 3,411,259 | A |  | 11/1968 | Anderson et al. |
| 4,111,188 | A |  | 9/1978 | Murphy, Jr. |
| 4,273,106 | A |  | 6/1981 | Gould |
| 4,862,665 | A | * | 9/1989 | Kneisel ............... E04D 1/20 52/539 |
| 5,074,093 | A |  | 12/1991 | Meadows |
| 5,671,577 | A |  | 9/1997 | Todd |
| 6,173,546 | B1 |  | 1/2001 | Schafer |
| 7,003,922 | B2 |  | 2/2006 | Fifield |
| 7,578,108 | B2 |  | 8/2009 | Swanson |
| 7,748,191 | B2 | * | 7/2010 | Podirsky ............... E04D 1/30 52/536 |
| 8,240,100 | B2 |  | 8/2012 | Kalkanoglu et al. |
| 8,297,020 | B1 |  | 10/2012 | Swanson |

(Continued)

*Primary Examiner* — Patrick Maestri
(74) *Attorney, Agent, or Firm* — Suzanne Kikel, Patent Agent

(57) ABSTRACT

Interlocking roof shingle has a front rounded tongue on the first side edge; a tongue on the first end edge; an elongated groove assembly on the upper surface with a groove defined therein; a groove in the second end edge of the body; a groove in the second side edge of the body; and an elongated tongue assembly on the lower surface. In an embodiment of the invention, the front rounded tongue of an upper roof shingle is inserted into the elongated groove assembly of a lower roof shingle while at the same time a leg of the elongated tongue assembly of the upper roof shingle enters into a groove in the second end edge of the lower roof shingle for interlocking upper and lower shingles. The tongue on the first end edge is inserted into a corresponding groove in the second end edge of an adjacent roof shingle.

16 Claims, 8 Drawing Sheets

(56) References Cited

U.S. PATENT DOCUMENTS

| | | | |
|---|---|---|---|
| 8,359,804 B2* | 1/2013 | Wakefield | E04D 1/20 52/483.1 |
| 2006/0130419 A1* | 6/2006 | Bowman | E04D 1/20 52/560 |
| 2008/0135088 A1 | 6/2008 | Corrales | |
| 2008/0135092 A1 | 6/2008 | Corrales | |
| 2012/0005978 A1* | 1/2012 | Jenkins | E04D 1/20 52/552 |
| 2015/0275520 A1* | 10/2015 | Nawate | E04D 3/365 52/302.1 |

* cited by examiner

INTERLOCKING ROOF SHINGLE AND ROOFING SYSTEM

BACKGROUND OF THE INVENTION

1. Field of the Invention

The present invention relates to roof shingles, and in particular, to an interlocking roof shingle and a roofing system comprising a plurality of interlocking roof shingles.

2. Brief Description of the Prior Art

Because of their exposure to the elements, roofs are provided with weather proofing to prevent damage to the interior structure. On residential buildings in particular, the roof is provided with a predetermined pitch to allow moisture to run off the roof. Secured to the roof are shingles which are overlapped in accordance with the pitch of the roof to direct moisture and/or water off of the roof. A variety of materials are used as roofing shingles, such as, metal, wood, and petroleum based materials. The most widely used shingles are made of asphalt because of their durability and ease of installation.

A primary reason for using roof shingles is to protect the interior of the building from water intrusion caused by rain and/or snow. High winds often damage these roof shingles by lifting and bending the shingle, thereby increasing the likelihood of water intrusion. A common technique in applying roof shingles is to overlap adjacent shingles such that the areas where the nails or staples fasten the shingle to the roof overlap. This technique for applying roof shingles to the roof allows the water to run downwardly from the roof top without penetrating the areas containing the fasteners. Typically, a roof will also contain a water barrier layer beneath the roof shingles, such as, tar paper to protect the roof so that the water does not enter the interior of the building.

Several roofing material products are available in the market place, such as tar shingles which traditionally are used, slate, shingle, simulated wood products, and metal sheeting. Some of these products, such as tar shingles, have advantages over some of the other roofing materials currently used in the market place in that they are relatively inexpensive and perform relatively well. Even though the other types of roofing material may be more expensive, an advantage of the more expensive roofing materials is that these types of roofing materials allow a different look to be applied to the roof of a building; but yet may suffer from poor performance since these types of roofing materials contain many seams and connection sites which usually are not weather-tight and which roofing materials are difficult to maintain. Recently, there has been an increased interest in metal roofing products in that they tend to have a desirable appearance, are durable, and provide high weather-tight performance compared to non-metal roofing products.

In a typical roofing installation, the roof shingles are installed beginning at the lowest point of the roof and extending out over the bottom edge of the roof. The shingles are mounted in rows with the side edge of each shingle proximate the adjacent shingle. The shingles in a row are not connected together nor are they overlapping each other, and fasteners, generally nails are used to attach the shingles to the roof. Subsequent rows of shingles generally are arranged to overlap the shingles in the immediately lower rows, but since there are no interconnections between the shingles, placement and spacing of each shingle relative to each other are left to the installer.

In order to facilitate installation and variation in climate conditions, asphalt shingles are widely used because of their flexibility. However, this characteristic, i.e. flexibility, in general, allows the asphalt shingle to be easily damaged by extreme winds which bend and tear the asphalt shingle. This condition is particularly troublesome in colder climates where the asphalt shingles tend to become brittle and eventually break. Other rigid type materials used in roof shingles, such as shake, clay, and metal generally are susceptible to damage from extreme temperatures and the natural expansion and contraction of these types of building materials.

A desirable aspect of shingle and slate roofing, irrespective of high cost and maintenance, is that the different colors or hues of the material can be composed on a roof to create a very appealing appearance, which is the result of a process called blending. Blending is the intentional placement of individual or groups of shingles having different colors or hues next to each other to create the desired aesthetic effect; such as, a weather-worn roof, a moss-laden roof, or simply a variety of different colors.

There is, therefore, a need in the art to provide a roof shingle which combines the advantages of prior art shingles while avoiding the disadvantages thereof.

There is still a further need in the art to provide a roof shingle and roofing system which greatly increases the structural integrity and durability of the roofing system even in high winds to prevent water intrusion.

There is a further need in to the art to provide an interlocking shingle which fits tightly with an adjacent shingle to prevent any rain or moisture from entering beneath the shingles to increase the life of the roofing system.

SUMMARY OF THE INVENTION

The present invention provides such a roof shingle and roofing system. The invention provides an interlocking roof shingle which comprises a "tongue and groove" connection for interlocking with an adjacent interlocking roof shingle in a same row and with an adjacent interlocking roof shingle in a row below and a row above. The "tongue and groove" features of each interlocking roof shingle allows the interlocking roof shingles to be arranged side by side and snapped together such as to create a water tight connection between the roof shingles and the surface of the roof. An elongated groove assembly extends widthwise along the top surface of each roof shingle and an elongated tongue assembly extends widthwise along the underside of each roof shingle.

In a first embodiment of the interlocking roof shingle of the invention, a front element in the form of a lip is located on a first side edge of the body of the interlocking roof shingle. This construction is such that when a first roof shingle, i.e. top shingle, is placed on top a second roof shingle, i.e. lower shingle, the lip of the top roof shingle extends over the top surface of the lower roof shingle and the elongated tongue assembly of the top roof shingle engages into the elongated groove assembly of the lower roof shingle. This arrangement is such that a water drainage channel is defined between the lip of the top roof shingle and the elongated groove assembly of the lower roof shingle.

In a second embodiment of the interlocking roof shingle of the invention, a front element of a first side edge of the body of the roof shingle is in the shape of an elongated tongue. This construction is such that when a first roof shingle, i.e. top shingle, is placed on top a second roof shingle, i.e. lower shingle, the elongated tongue of the first side edge of the body of the top roof shingle snaps into the elongated groove assembly on the top surface of the lower roof shingle and the elongated tongue assembly on the underside of the top roof shingle snaps into an outer edge groove of the lower roof shingle to interlock the top and lower roof shingles together in an overlapping fashion. In such an arrangement, the top roof shingle extends over an area of the lower shingle containing the apertures for receiving fastening means, i.e. screws for affixing the lower roof shingle to the roof in a manner to prevent water and/or moisture from entering into this area between the top and lower roof shingle, thereby helping to increase the life of the roof shingles.

In the invention, each interlocking roof shingle interlocks with the interlocking roof shingle on each side in an adjacent relationship relative to each other and to the roof shingles above or below it in an overlapping relationship with the shingles in a lower and upper row to ensure optimum spacing and alignment while providing a long lasting roof for the building. The roof shingle may be comprised of plastic, a plastic blend, fiberglass, a fiberglass blend and combinations thereof, or other similar materials presently used in decks, windows, and siding in the building industry. Other suitable types of materials may also be used in the roof shingles of the invention.

A tracking system comprised of track elements is provided along the lower edge and side edges of the roof and attached to the facia to receive and secure the interlocking roof shingles to the roof. The track elements are generally L-shaped in cross-section and form a U-shaped channel or groove with the surface of the roof when the track elements are affixed to the facia. In some instances, this channel or groove of the L-shaped track elements receives a tongue of the roof shingles such as to lock the roof shingles to the roof. In other instances, this channel or groove receives a groove end of the roof shingles to affix the roof shingles to the roof.

Several interlocking roof shingles may be snapped together to form a roof shingle tile unit which may then be installed as a unit onto the roof and into the track elements of the roof tracking system.

The interlocking roof shingle of the invention may be sprayed with LINE-X® or Rhino Lining® spray or similar material to give the roof shingles a protective coating so as to increase the longevity of the interlocking roof shingles, and therefore, the roofing system.

These and other features and advantages of the present invention will be better appreciated and understood when the following description is read in light of the accompany drawings.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different view.

DETAILED DESCRIPTION OF THE INVENTION

Figure 1:
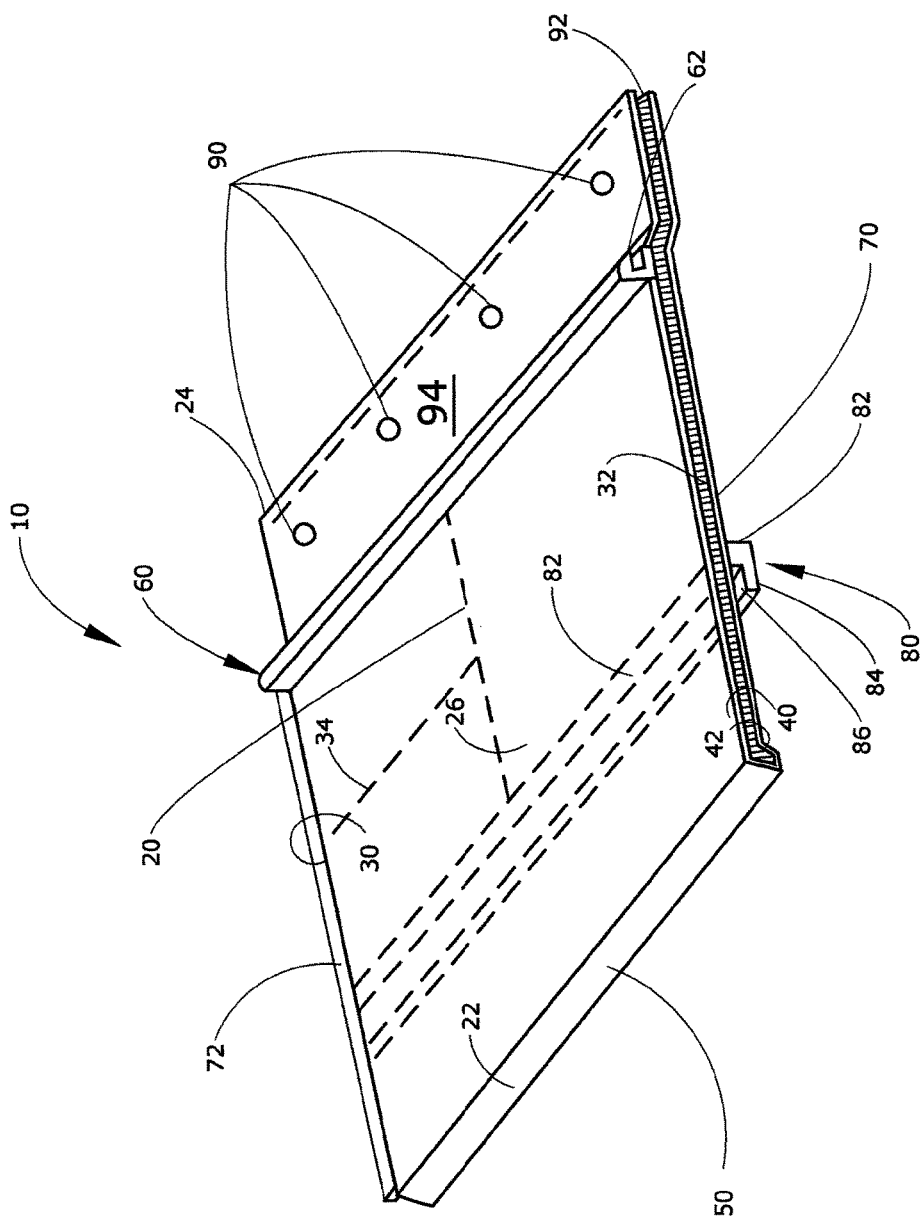
FIG. 1 is a perspective view of a first embodiment of an interlocking roof shingle of the present invention.
Figure 2:
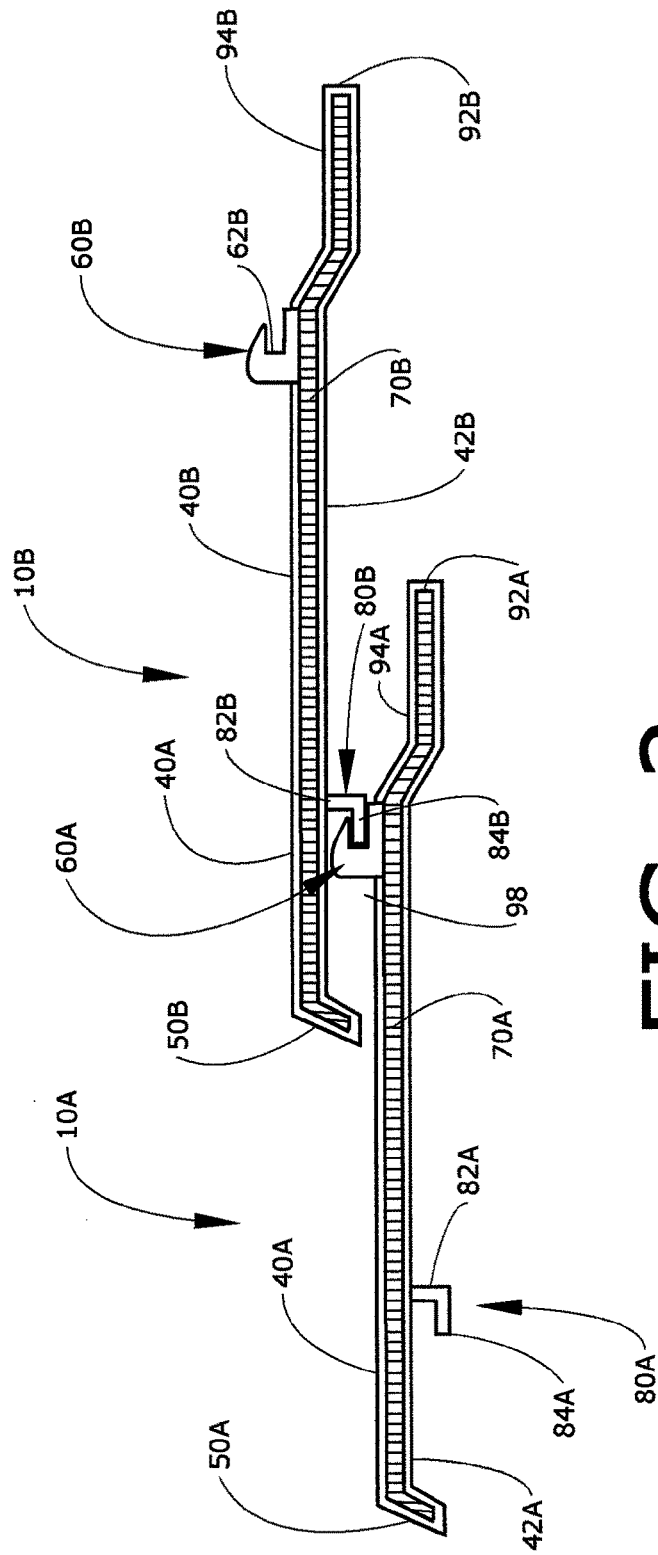
FIG. 2 is a side elevational view of a lower roof shingle and an upper roof shingle of FIG. 1 illustrating an interlocking relationship between the roof shingles.

FIGS. 1 and 2 illustrate a first embodiment of an interlocking roof shingle 10 of the present invention. Interlocking roof shingle 10 is generally of rectangular shape. With particular reference to FIG. 1, interlocking roof shingle 10 comprises a body 20 which includes a first side edge 22 and a second side edge 24. A transverse axis 26 (shown in dotted lines) extends between the first side edge 22 and the second side edge 24, the first side edge 22 being spaced away from the second side edge 24 along transverse axis 26. Body 20 further includes a first end edge 30 and a second end edge 32. A longitudinal axis 34 (shown in dotted lines) extends between first end edge 30 and second end edge 32, the first end edge 30 being spaced away from second end edge 32 along longitudinal axis 34. Body 20 further comprises an upper surface 40 and a lower surface 42.

Still referring particularly to FIG. 1, a front element 50 is located along the length of first side edge 22 of body 20 and extends between first end edge 30 and second end edge 32 of body 20. As shown in FIGS. 1 and 2, front element 50 is in the shape of a downward lip which extends downwardly from upper surface 40 and toward lower surface 42. An elongated groove assembly 60 is located on upper surface 40 of body 20 and runs parallel to and is spaced away from second side edge 24 of body 20. Elongated groove assembly 60 extends between first end edge 30 and second end edge 32 and has a groove 62 defined therein along the entire length thereof. As particularly shown in FIG. 1, groove 62 of elongated groove assembly 60 lies in a plane which is parallel to a plane in which upper surface 40 of body 20 extends.

Still referring particularly to FIG. 1, an end groove 70 is defined in second end edge 32 of body 20 and extends parallel to and in the direction of transverse axis 26 and extends lengthwise between first side edge 22 to second side edge 24 of body 20. Body 20 further includes a tongue element 72 on first end edge 30 of body 20. Tongue element 72 extends parallel to transverse axis 26 and extends lengthwise between first side edge 22 and second side edge 24 of body 20.

Referring again to FIG. 1, an elongated tongue assembly 80 is located on lower surface 42 of body 20. Elongated tongue assembly 80 is in an L-shaped configuration and comprises a first leg 82 extending in a vertical direction and a second leg 84 extending in a horizontal direction. The first leg 82 is affixed to lower surface 42. Both first leg 82 and second leg 84 extend the length between first end edge 30 and second end edge 32 of body 20. First leg 82 extends away from lower surface 42, and second leg 84 is spaced away from lower surface 42 of body 20 to define an open area 86 between lower surface 42 of body 20 and second leg 84 of elongated tongue assembly 80. The purpose of elongated tongue assembly 80 is best appreciated with reference to FIG. 2, which more clearly illustrates that second leg 84B of an upper roof shingle 10B is accommodated in groove 62A of elongated groove assembly 60A of a lower roof shingle 10A, more about which will be explained herein below.

Referring again to FIG. 1, second side edge 24 has a groove 92 which extends between first end edge 30 and second end edge 32. The area extending between elongated groove assembly 60 and second side edge 24 of body 20 is indicated at numeral 94, and this area 94 runs parallel to groove 92. This area 94 contains several apertures 90 for receiving fastening means, such as, for example, screws (not shown) for attaching roof shingle 10 to a roof in a manner well-known to those skilled in the art. As can be appreciated, roof shingle 10 of FIG. 1 can be arranged in an overlapping relationship when installed on a roof. Such an arrangement is clearly shown in FIG. 2, where a top roof shingle 10B is overlapped with a lower roof shingle 10A. It is to be appreciated that the top roof shingle 10B is comprised of the same components as the roof shingle 10 of FIG. 1 and these components are indicated with a "B" after such components. Likewise, the lower roof shingle 10A is comprised of the same components as the roof shingle 10 of FIG. 1, and these components are indicated with an "A" after such components. In FIG. 2 upper roof shingle 10B overlaps lower roof shingle 10A and these two roof shingles are interlocked by engaging elongated tongue assembly 80B of upper roof shingle 10B in the elongated groove assembly 60A of lower roof shingle 10A. In this arrangement, a portion of upper roof shingle 10B containing front element 50B overlaps with the upper surface 40B of lower roof shingle 10A and forms a water drainage channel 98 between upper roof shingle 10B and lower roof shingle 10A.

In some instances, the lip of front element 50B of the embodiment of FIGS. 1 and 2 may contact upper surface 40A of lower roof shingle 10A to better enclose water drainage channel 98 and to better control the flow of water directly through water drainage channel 98. Even though FIGS. 1 and 2 show area 94 of roof shingle 10 being in a stepped fashion with regard to the upper surface 40, it is to be appreciated that area 94 may extend straight in the same horizontal plane as upper surface 40 of roof shingle 10 and not be in a stepped configuration as shown therein.

Figure 3:
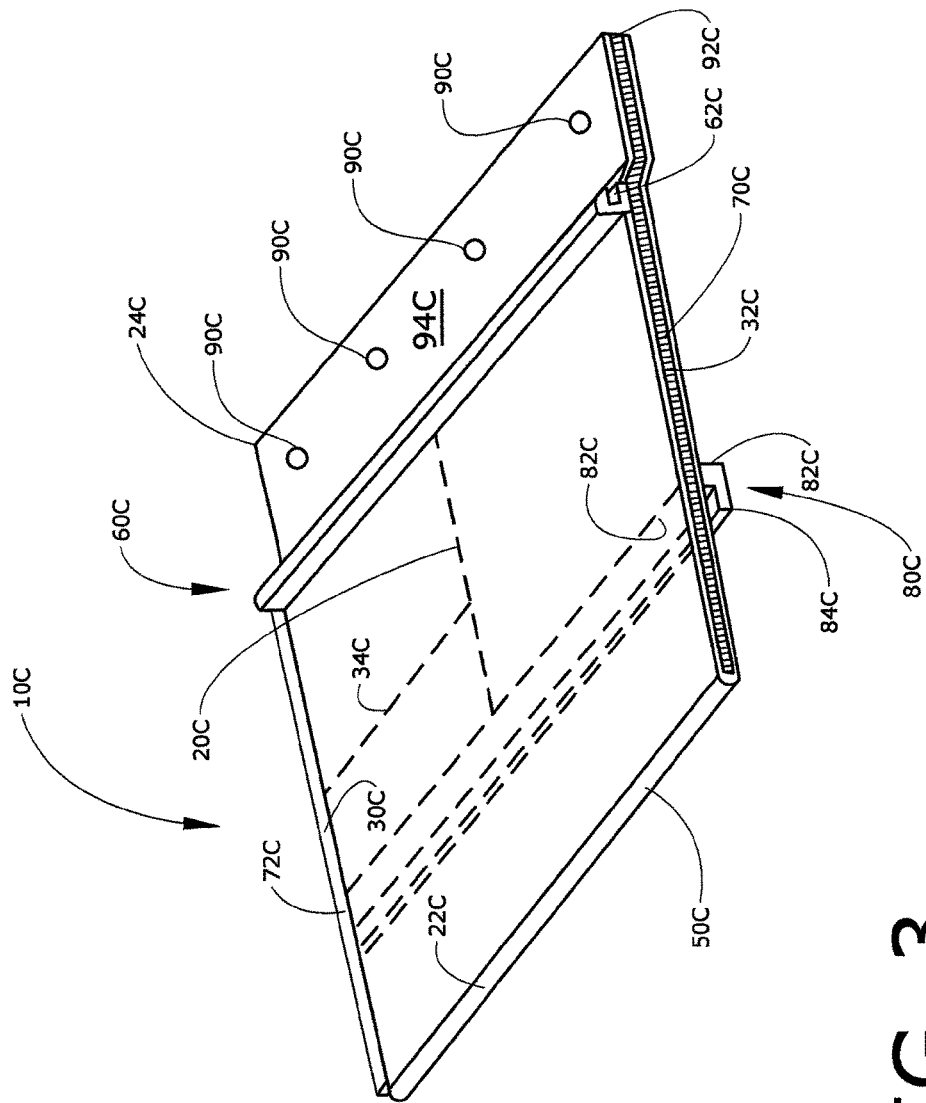
FIG. 3 is a perspective view of a second embodiment of an interlocking roof shingle of the present invention.
Figure 4:
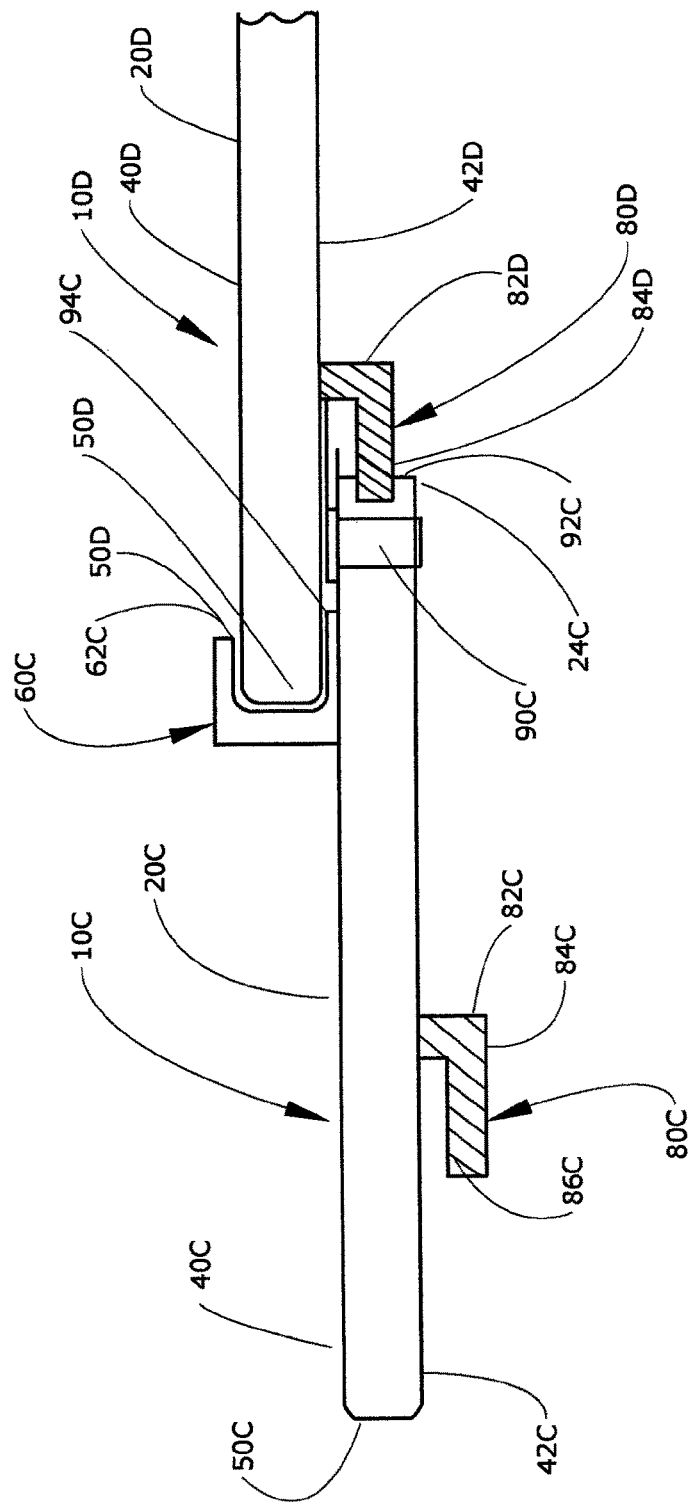
FIG. 4 is a schematic side elevational view of a lower roof shingle and an upper roof shingle of FIG. 3 illustrating an interlocking relationship between the roof shingles.

FIGS. 3 and 4 illustrate a second embodiment of an interlocking roof shingle indicated at reference numeral 10C of the present invention. Interlocking roof shingle 10C is generally of rectangular shape. With particular reference to FIG. 3, roof shingle 10C comprises a body 20C which includes a first side edge 22C and a second side edge 24C. A transverse axis 26C (shown in dotted lines) extends between the first side edge 22C and the second side edge 24C, the first side edge 22C being spaced away from the second side edge 24C along transverse axis 26C. Body 20C further includes a first end edge 30C and a second end edge 32C. A longitudinal axis 34C (shown in dotted lines) extends between first end edge 30C and second end edge 32C, the first end edge 30C being spaced away from second end edge 32C along longitudinal axis 34C. Body 20C further comprises an upper surface 40C and a lower surface 42C.

Still referring particularly to FIG. 3, a front element 50C is located along the length of first side edge 22C of body 20C and extends between first end edge 30C and second end edge 32C of body 20C. As shown best in FIG. 3 front element 50C is in the shape of a rounded tongue. An elongated groove assembly 60C is located on upper surface 40C of body 20C and runs parallel to and is spaced away from second side edge 24C of body 20C. Elongated groove assembly 60C extends between first end edge 30C and second end edge 32C and has a groove 62C defined therein along the entire length thereof. As particularly shown in FIG. 3, groove 62C of elongated groove assembly 60C lies in a plane which is parallel to a plane in which upper surface 40C of body 20C extends.

Still referring particularly to FIG. 3, an end groove 70 is defined in second end edge 32C of body 20C and extends parallel to and in the direction of transverse axis 26C and extends lengthwise between first side edge 22C to second side edge 24C of body 20C. Body 20C further includes a tongue element 72C on first end edge 30C of body 20C. Tongue element 72C extends parallel to transverse axis 26C and extends lengthwise between first side edge 22C and second side edge 24C of body 20C.

Referring again to FIG. 3, an elongated tongue assembly 80C is located on lower surface 42C of body 20C. Elongated tongue assembly 80C is in an L-shaped configuration and comprises a first leg 82C extending in a vertical direction and a second leg 84C extending in a horizontal direction. First leg 82C is affixed to lower surface 42C. Both first leg 82C and second leg 84C extend the length between first end edge 30C and second end edge 32C of body 20C. First leg 82C extends away from lower surface 42C, and second leg 84C is spaced away from lower surface 42C of body 20C to define an open area or space 86C between lower surface 42C of body 20C and second leg 84C of elongated tongue assembly 80C. In this embodiment, and as best appreciated with reference to FIG. 4, an upper roof shingle 10D is interlocked to a lower roof shingle 10C. This is accomplished by inserting second leg 84D of elongated tongue assembly 80D of upper roof shingle 10D into groove 92C extending along the length of second side edge 24C of lower roof shingle 10C, more about which will be explained herein below.

Referring more particularly to FIG. 3, the area extending between elongated groove assembly 60C and second side edge 24C of body 20C is indicated at numeral 94C. This area 94C contains several apertures 90C for receiving fastening means, such as, for example, screws (not shown) for attaching roof shingle 10C to a roof in a manner well known to those skilled in the art. As can be appreciated, roof shingle 10C of FIG. 3 can be arranged in an overlapping relationship when installed on a roof. Such an arrangement is clearly shown in FIG. 4, where a top roof shingle 10D is overlapped with a lower roof shingle 10C. It is to be appreciated that the top roof shingle 10D is comprised of the same components as the roof shingle 10C of FIG. 3 and these components are indicated with a "D" after such components. Likewise, the lower roof shingle 10C of FIG. 4 is comprised of the same components as the roof shingle 10C of FIG. 3, and these components are indicated with a "C" after such components. In FIG. 4 upper roof shingle 10D overlaps lower roof shingle 10C and these two roof shingles 10D and 10C are interlocked by engaging elongated tongue assembly 80D of upper roof shingle 10D in the elongated groove 92C along the length of second side edge 24C of lower roof shingle 10C. In this arrangement, when front element 50D of upper roof shingle 10D is inserted into elongated groove assembly 60C of lower roof shingle 10C, the under surface 42D of upper roof shingle 10D spans across area 94C of lower roof shingle 10C to encase this area 94C where the fastening means are inserted so as to make this area 94C water-tight, thereby, lessening the chances for moisture and/or water from entering this area 94C, and thereby, extending the life of interlocking roof shingles 10C and 10D.

Figure 5:
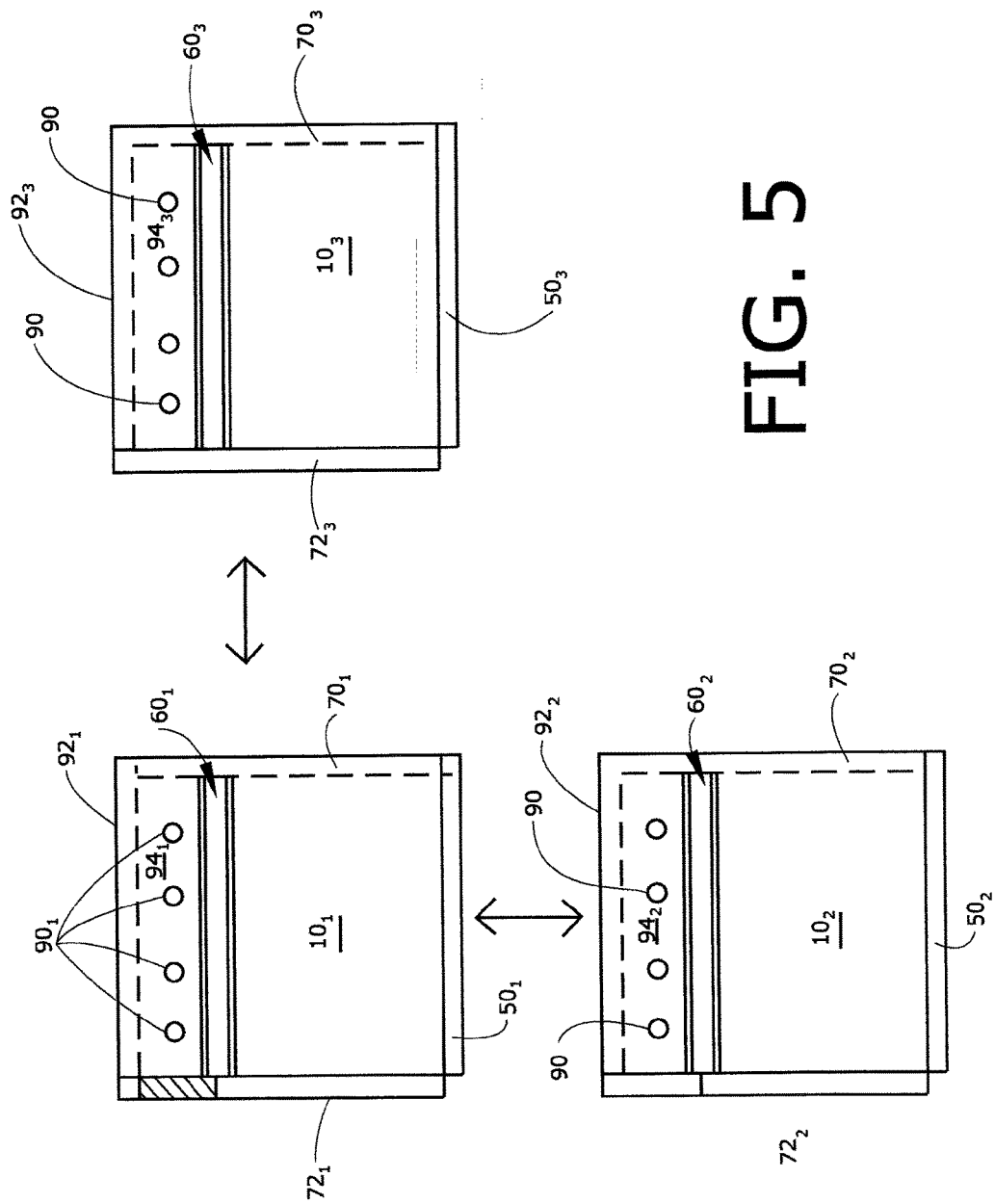
FIG. 5 is an exploded plan view illustrating the manner in which several interlocking roof shingles of FIGS. 3 and 4 are joined together to form a roof shingle unit.

FIG. 5 illustrates the manner in which roof shingles $10_1$, $10_2$ and $10_3$ can be interlocked with an adjacent similar roof shingle. As shown, tongue element $72_3$ of body $10_3$ is accommodated in an end groove $70_1$ of an adjacent body $10_1$ when body $10_1$ and adjacent body $10_3$ are in place on a roof to interlock body $10_1$ and adjacent body $10_3$. Roof shingles $10_1$ and $10_2$ may be interlocked in a manner similar to that described herein above with regard to roof shingles 10C and 10D of FIGS. 3 and 4 or with regard to roof shingles 10A and 10D of FIGS. 1 and 2.

Interlocking roof shingle 10 of FIGS. 1, 2, 3 and 4 is attached to the roof by suitable fasteners extending through pre-drilled apertures 90 defined in area 94 extending between elongated groove assembly 60 and the second side edge 24 of each roof shingle 10. In an embodiment of the invention, such suitable fasteners may be nails, and preferably, are screws.

FIG. 4 illustrates the manner in which an upper interlocking roof shingle 10D is interlocked with a lower interlocking roof shingle 10C. In practice, lower interlocking roof shingle 10C is secured to a roof (not shown) by inserting a fastener, such as, a screw into each aperture 90C provided in the area 94C of lower roof shingle 10C (FIG. 3). In order to secure upper interlocking roof shingle 10D to lower roof shingle 10C, tongue element 50D of upper roof shingle 10D is slid down and snapped into groove 62C of elongated groove assembly 60C of lower roof shingle 10C while at the same time, second leg 84D of elongated tongue assembly 80D of upper roof shingle 10D snaps into groove 92C located along the second end edge 24C of lower roof shingle 10C.

Still referring to FIG. 4, a second alternate procedure for securing upper interlocking roof shingle 10D to lower roof shingle 10C is to snap tongue element 50D of upper roof shingle 10D into groove 62C of elongated groove assembly 60C of lower roof shingle 10C while at the same time snapping second leg 84D of elongated tongue assembly 80D of upper roof shingle 10D around second side edge 24C of lower roof shingle 10C. Even though not shown in FIG. 4, apertures 90C would be located inwardly of second side edge 24C such that there is a sufficient area for second leg 84D of elongated tongue assembly 80C to be securely snapped around second side edge 24C of lower roof shingle 10C. Also, the same holds true for securing the upper roof shingle 10D to lower roof shingle 10C according to the first procedure described in the preceding paragraph. That is, apertures 90C are spaced inwardly away from second side edge 24C such that there is sufficient space for second leg 84D of elongated tongue assembly 80D of upper roof shingle 10D to be received into groove 92C of second side edge 24C of lower roof shingle 10C while at the same time allowing suitable fastening means (not shown) to be inserted in apertures 90C.

FIG. 5 illustrates the manner in which adjacent side-by-side interlocking roof shingles $10_1$ and $10_3$ are connected. The double arrows indicate that roof shingle $10_1$ and $10_3$ are moved toward each other and roof shingle $10_1$ and $10_2$ are moved toward each other. As is apparent from the above teachings, roof shingle $10_3$ is moved toward roof shingle $10_1$ such that tongue element $72_3$ of roof shingle $10_3$ snaps into groove $70_1$ of roof shingle $10_1$. In a similar fashion, a roof shingle (not shown) on the opposite side of roof shingle $10_1$ can be attached to roof shingle $10_1$ wherein tongue element $72_1$ of roof shingle $10_1$ would be received in a respective groove 70 of the roof shingle on the opposite side of roof shingle $10_1$. Still referring to FIG. 5, an overlapping relationship of roof shingles $10_1$ and $10_2$ can be accomplished by the process described herein above with regard to the upper roof shingle 10B and lower roof shingle 10A of FIG. 2, or with regard to the upper roof shingle 10D and lower roof shingle 10C of FIG. 4.

It is apparent from the above teachings particularly in the preceding paragraph with regard to FIG. 5 that several roof shingles 10 of FIG. 1 can be interconnected in an interlocking relationship in a side-by-side adjacent relationship by inserting tongue element 72 of roof shingle 10 into groove 70 of an adjacent roof shingle 10 to form a row of roof shingles. These same roof shingles 10 can be attached to an upper roof shingle through the process described herein above with respect to FIGS. 3 and 4, where a tongue element 50 of an upper roof shingle 10 is snapped into groove 62 of an elongated groove assembly 60 of a lower roof shingle and the second leg 84 of the elongated tongue assembly 80 of an upper roof shingle is received into groove 92 along the second end edge 24 of the lower roof shingle to form a second row of roof shingles. This construction and interlocking of lower and upper roof shingles 10 encase area 94 containing apertures 90 in a water tight connection in order to assist in preventing moisture from entering this area, thereby extending the life of the roof shingles and adding to the structural integrity of the roofing system.

In an embodiment of the invention, roof shingle 10 of all the embodiments of the invention may be formed via an injection molding process. Furthermore, the roof shingle 10 of the invention especially in view of an injection molding process may provide for a different shingle design, such as, for example, the injection molding process may form a projection with a semi-circular configuration, a pointed configuration, or a semi-hexagonal configuration projecting from the top surface of the roof shingle thereby adding a design and thus an aesthetic appearance to the roof. Roof shingles 10 of the invention may be comprised of plastic, a plastic blend, fiberglass, a fiberglass blend, or other suitable materials presently used in decks, windows, and siding in the building industry. In some instances, the roof shingles may be sprayed with a protective coating, such as, for example, LINE-X® or Rhino Lining® spray or similar material to increase the longevity of the interlocking roof shingles 10, and therefore, the roofing system.

It is to be further appreciated that the roof shingles 10 of the invention may also be used with solar panels presently available in the market place. Also, the internal surfaces of the several grooves and the external surfaces of the several tongue elements of the roof shingle 10 are formed such that the tongue elements easily snap into a respective groove of an adjacent roof shingle and that the material of the tongue elements and the forming the grooves are flexible for such snapping action with the grooves tightly anchoring the tongue elements in place for an interlocking relationship between one or more roof shingles 10.

Figure 6:
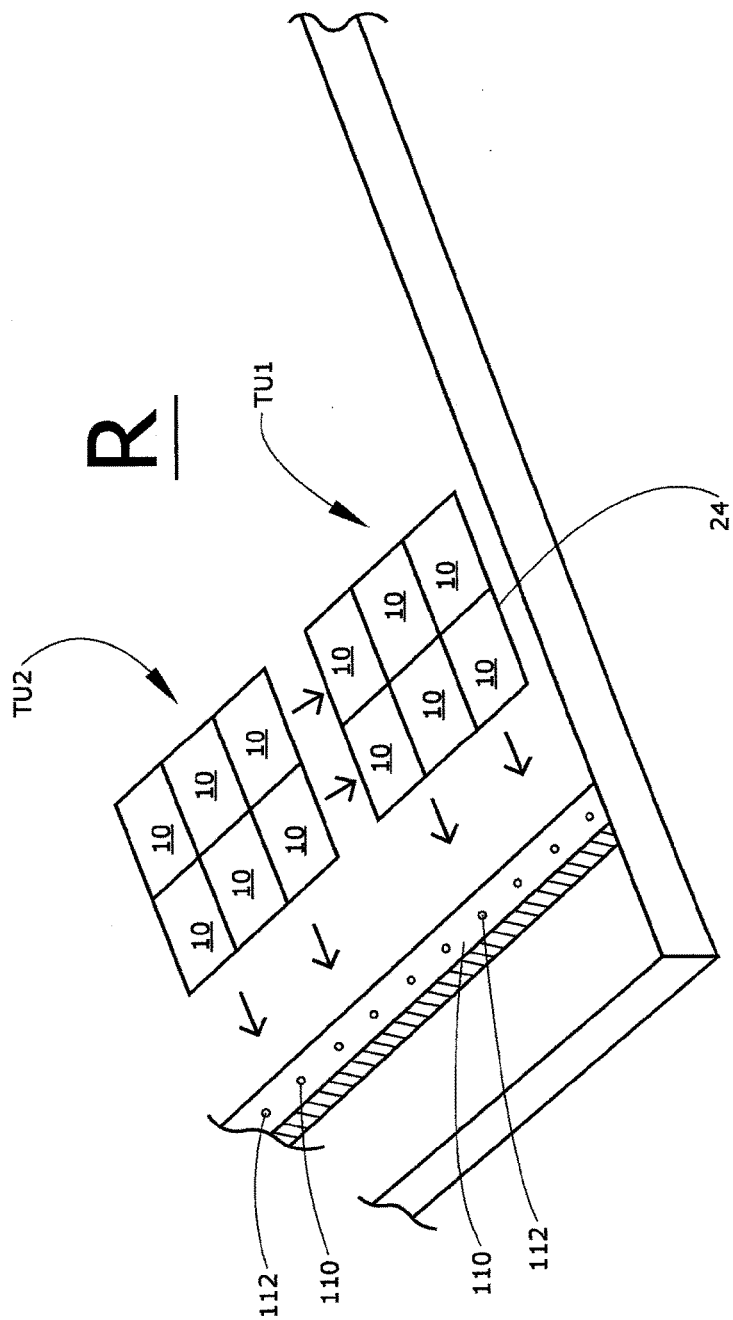
FIG. 6 is partial exploded, perspective schematic view showing several roof shingle tile units and their installation on a roof and into a track element of the tracking system of the invention.
Figure 7:
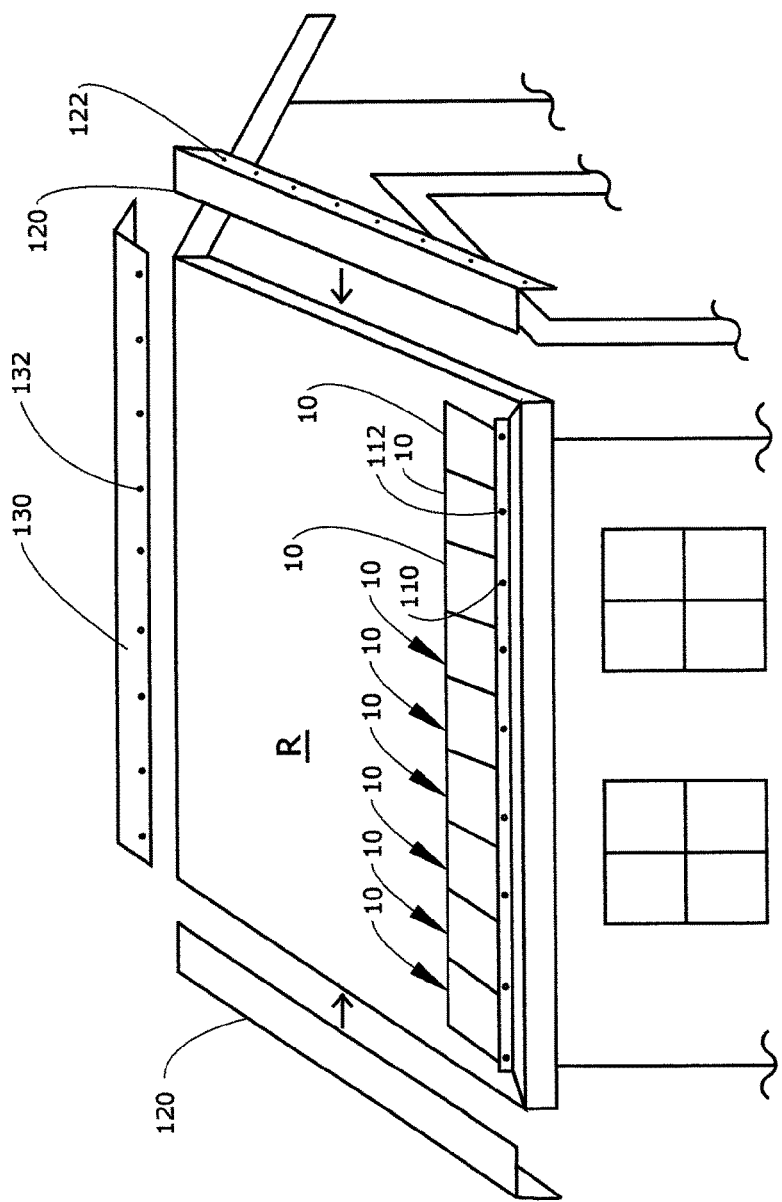
FIG. 7 is partial exploded, perspective schematic view showing a row of roof shingles of the invention and their installation on a roof and into the track elements of the tracking system of the invention.

In some instances, instead of each roof shingle 10 being attached to a roof individually, in order to expedite the roofing process, several such roof shingles 10 of FIGS. 1, 2, 3 and 4 can be snapped together to form a tile unit, and these several tile units can then be installed on the roof as a unit. This is particularly shown in FIG. 6, where roof shingle tile units TU1 and TU 2. A roofing system of the invention is shown in FIGS. 6 and 7. The roofing system comprises a plurality of roof track elements 110, 120 and 130. Roof track elements 110, 120 and 130 are L-shaped elongated members and are attached through suitable means to the bottom edge, side edges and top of roof R. As shown in FIGS. 6 and 7, a leg of each roof track element 110, 120 and 130 contains several pre-drilled apertures indicated at reference numeral 112 for roof track element 110; at reference numeral 122 for roof track element 120; and at reference numeral 132 for roof track element 130.

When roof track elements 110, 120 and 130 are attached to Roof R, they form a channel for receiving the tile units of the invention. As shown in FIG. 6, tiles units TU1 and TU 2 are inserted into roof track element 110. This is achieved by first bringing roof tile unit TU1 down along the surface of the roof such that each roof shingle 10 of tile unit TU1 engages into the channel of roof track element 110. Roof tile unit TU 1 is then affixed to the roof surface by inserting several fastening means into apertures 90 of roof tile 10 as described herein above. Tile unit TU2 is then brought down alongside tile unit TU 1 and interlocked with tile unit TU1 and roof track element 110. This procedure is performed until a first row of roof shingle tile units extend across the bottom edge of roof R and wherein each roof shingle tile unit interlocks with an adjacent tile unit and with roof track element 110. A second row of tile units can then be placed above the first row of tile units and interlocked with the tile units of the first row and attached to the roof in a similar manner. Once the roof surface is covered completely with the roof tile units of the invention, roof track elements 120 are then positioned along the side of the roof and are attached to the facia of the roof. The edges of the roof tile units arranged along the sides of roof R are secured within the channels form by the roof track elements 120 and the roof for installing a roof to the building. Roof track element 130 may be installed on top of roof R and against the top row of roof tile units on either side of the pitched type roof of FIG. 7. Also as shown in FIG. 7, individual roof shingles 10 may also be installed along a first row of the row and snapped into track element 110 wherein each roof shingle 10 is interlocked with an adjacent roof shingle. In a customary manner, additional rows of roof shingles may then be interlocked together to completely cover the surface of the roof R. As is apparent from teachings of the invention and FIGS. 6 and 7, each roof shingle or each roof shingle tile unit are interlocked to each other and the roof track elements 110, 120 and 130 are interlocked with the roof shingles 10 or the roof shingle tile units to obtain an interlocking of the entire roofing system.

The installation of roof track elements 110, 120 and 130 add to the structural integrity of the roofing system, which is initially achieved via the interlocking relationship of the roof shingle tile units. It can also be appreciated that if there is an area of the roof that is less than the dimensions of the roof shingle 10, than roof shingle 10 can be cut appropriately along the width and/or length of its body 20 and installed on the roof to cover this area of the roof while still being in an interlocking relationship with its neighboring roof shingles.

From the above it is apparent that an interlocking roof shingle has a front element on the first side edge, a tongue element on the first end edge, an elongated groove assembly on its upper surface with a groove defined therein, a groove along the second end edge of the body, a groove along the second side edge of the body, and an elongated tongue assembly on its lower surface. To form a roof shingle unit, the front tongue element of an upper roof shingle is inserted into the elongated groove assembly of a lower roof shingle while at the same time the horizontal leg of the elongated tongue assembly of the upper roof shingle enters into the groove along the second side edge of the lower roof shingle. In this instance, the front tongue element is in the shape of a downward lip. As alternate manner for forming a roof shingle unit is to insert the elongated tongue assembly of the upper roof shingle into the elongated groove assembly of the lower roof shingle. In this instance, the front tongue element is in the shape of a rounded tongue. Thereafter, the tongue element along the first end edge of each roof shingle is then inserted into a corresponding groove along the second end edge of an adjacent roof shingle. Roof track elements are provided to receive respective tongue elements of the roof shingles.

Figure 8:
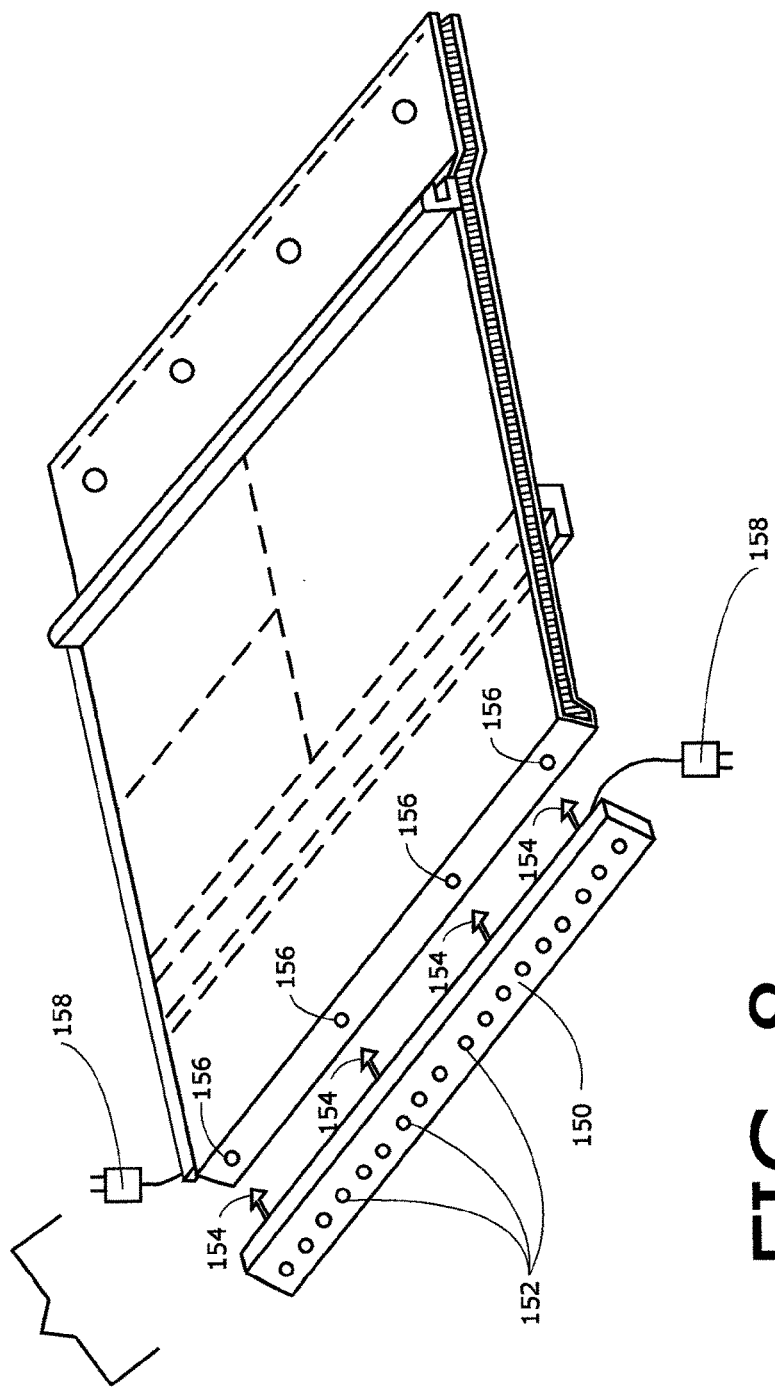
FIG. 8 is a perspective view of an interlocking roof shingle of FIG. 1 illustrating the attachment of an LED light panel thereto.

FIG. 8 illustrates the interlocking roof shingle 10 of FIG. 1 having the same components as that of interlocking roof shingle 10 except for the addition of an LED panel or strip 150. This LED panel or strip 150 contains a plurality of LED lights, some of which are indicated at reference numeral 152. This strip 150 can be attached to lip 50 of roof shingle 10 via suitable fasteners, such as screws, clips or bolts in a manner well-known to those skilled in the art. The arrows 154 indicate that such fasteners can be received in apertures 156 in lip 50 of roof shingle 10. As also indicated at the opposed ends of LED strip 150, wiring connection pieces 158 are provided. These wiring connection pieces 158 can be connected to the wiring connection pieces contained in an LED strip of an adjacent interlocking roof shingle 10.

It is also to be understood that interlocking roof shingle 10 of FIG. 1 and interlocking roof shingle 10C of FIG. 3 are formed via a molding process, the technology of which is well known to those skilled in the art. It is to be further appreciated that solar panels (not shown) those of which are well-known to those skilled in the art, may also be incorporated in interlocking roof shingles 10 and 10C during the molding process for fabricating interlocking roof shingles 10 and 10C. It is to be further appreciated that interlocking roof shingles 10 and 10C of the invention, with or without solar panels, can be molded to any desirable shape and/or sprayed or painted with any desirable color.

While the present invention has been described in connection with the preferred embodiments of the various figures, it is to be understood that other similar embodiments may be used or modifications and additions may be made to the described embodiment for performing the same function of the present invention without deviating there from. Accordingly, it is intended by the appended claims to cover all such changes and modifications as come within the spirit and scope of the invention.

What is claimed is:
1. An interlocking roof shingle comprising:
a body comprising:
a first side edge, a second side edge, and a transverse axis extending between the first side edge and the second side edge, the first side edge being spaced apart from the second side edge along the transverse axis;
a first end edge, a second end edge, and a longitudinal axis extending between the first end edge and the second end edge, the first end edge being spaced apart from the second end edge along the longitudinal axis;
an upper surface and a lower surface;
a front tongue element extending from the first side edge of the body;
an elongated groove assembly on the upper surface of the body and having a groove defined therein and extending from the first end edge of the body to the second end edge of the body and defining an area with the second side edge of the body;
the second end edge of the body having a groove defined therein and extending between the first side edge and the second side edge of the body;

the second side edge of the body having a groove defined therein and extending between the first end edge and the second end edge of the body;

a tongue element on the first end edge of the body and extending between the first side edge and the second side edge;

an elongated tongue assembly located on the lower surface of the body and extending between the first end edge and the second end edge of the body and including a first leg mounted on the lower surface of the body and a second leg spaced away from the lower surface to define an open area in the elongated tongue assembly; and a plurality of apertures in the area defined between the elongated groove assembly and the second side edge of the body.

2. The interlocking roof shingle of claim 1, wherein the front tongue element extending from the first side edge of the body of the roof shingle is in the form of a downward lip, and wherein for the assemblage of a lower roof shingle and an upper roof shingle, the elongated tongue assembly of the upper roof shingle is snapped into the groove of the elongated groove assembly of the lower roof shingle.

3. The interlocking roof shingle of claim 1, wherein the front tongue element extending from the first side edge of the body of the roof shingle is in the form of a rounded tongue and wherein for the assemblage of a lower roof shingle and an upper roof shingle, the rounded tongue of the upper roof shingle snaps into the elongated groove assembly of the lower roof shingle and the elongated tongue assembly of the upper roof shingle snaps into the groove located along the second side edge of the lower roof shingle.

4. The interlocking roof shingle of claim 1 comprised of material selected from the group consisting of plastic, a plastic blend, fiberglass, a fiberglass blend, and combinations thereof.

5. The interlocking roof shingle of claim 1 formed by an injection molding process.

6. A roof shingle unit comprised of a plurality of interlocking roof shingles of claim 1 and wherein the plurality of interlocking roof shingles are interlocked together in a side-by-side relationship with an adjacent roof shingle and in an overlapping relationship with a roof shingle to form an upper row and a lower row of roof shingles.

7. A roof shingle unit comprised of a plurality of interlocking roof shingles of claim 1, and wherein the plurality of interlocking roof shingles comprises at least six with three roof shingles forming a first row and three roof shingles forming a second row.

8. A roofing system comprising the roof shingle unit of claim 6, and including a first track element mounted on a roof adjacent to one edge of the root and wherein a bottom row of roof shingles is received and locked in the first track element to secure the bottom row of roof shingles to the roof.

9. The roof shingle unit of claim 8, wherein the track system further comprises a second track element and a third track element mounted on a side edge of the root and wherein the second side edges of the roof shingles located adjacent to the side edges of the roof are accommodated in the second track element and the third track element for securing a plurality of roof shingle tile units for installation of the tile units on the roof.

10. A process for forming a roof shingle unit comprising: providing at least a first roof shingle, a second roof shingle, a third roof shingle and a fourth roof shingle; and wherein each roof shingle comprises a body which includes a first side edge, a second side edge, a first end edge, a second end edge, a top surface and a lower surface in abutting contact with the roof when the first roof shingle is in place on the roof;

a front element along the first side edge of the body and extending between the first end edge and the second end edge;

a tongue element on the first end edge of the body and extending between the first side edge and the second side edge of the body;

an elongated groove assembly on the upper surface of the body and extending between the first side edge and the second side edge of the body and having a groove defined therein;

the second end edge of the body having a first groove defined therein and extending between the first side edge and the second side edge;

the second side edge of the body having a second groove defined therein and extending between the first end edge and the second end edge;

an elongated tongue assembly located on the lower surface of the body and extending between the first end edge and the second end edge of the body; and interlocking the first roof shingle with the second roof shingle by sliding the elongated tongue assembly of the first roof shingle into the groove of the elongated groove assembly of the second roof shingle to form an overlapping relationship of the front element of the first roof shingle with the top surface of the second roof shingle.

11. The process of claim 10, the steps further comprising: providing a third roof shingle and a fourth roof shingle to form a side-by-side relationship with the second roof shingle; and wherein the tongue element on the first end edge of the body of the second roof shingle is snapped into the groove on the second side edge of the body of the third roof shingle and the tongue element on the first end edge of the body of the fourth roof shingle is snapped into the groove on the second side edge of the body of the second roof shingle.

12. A roofing system comprising a plurality of roof shingles of claim 1, and further comprising:

a first track element attached to an edge of a roof and arranged to abut against a lower row of roof shingles arranged along the bottom of a roof;

a second track element attached to a first side of the roof and arranged to abut against the rows of roof shingles extending along the first side of the roof;

a third track element attached to a second side of the roof and arranged to abut against the rows of roof shingles extending along the second side of the roof; and a fourth track element attached to the upper rows of roof shingles arranged on either side of the roof for securing the upper rows of roof shingles to the roof.

13. The roofing system of claim 12, wherein the first track element, the second track element, the third track element and the fourth track element comprise a plurality of apertures for attachment to the roof.

14. The interlocking roof shingle of claim 1, further comprising an LED strip attached to the front tongue element extending from the first side edge of the body of the interlocking roof shingle and having wiring connection pieces for connection with an adjacent interlocking roof shingle.

15. A process for forming a roof shingle unit comprising:
providing at least a first roof shingle, a second roof shingle, a third roof shingle and a fourth roof shingle; and wherein each roof shingle comprises
a body which includes a first side edge, a second side edge, a first end edge, a second end edge, a top surface and a lower surface in abutting contact with the roof when the first roof shingle is in place on the roof;
a front element along the first side edge of the body and extending between the first end edge and the second end edge;
a tongue element on the first end edge of the body and extending between the first side edge and the second side edge of the body;
an elongated groove assembly on the upper surface of the body and extending between the first side edge and the second side edge of the body and having a groove defined therein;
the second end edge of the body having a first groove defined therein and extending between the first side edge and the second side edge;
the second side edge of the body having a second groove defined therein and extending between the first end edge and the second end edge;
an elongated tongue assembly located on the lower surface of the body and extending between the first end edge and the second end edge of the body; and
interlocking the first roof shingle with the second roof shingle by snapping the front element of the first roof shingle into the groove of the elongated groove assembly of the second roof shingle and snapping the elongated tongue assembly of the first roof shingle into the groove located along the second side edge of the second roof shingle.

16. The process of claim 15, the steps further comprising:
providing a third roof shingle and a fourth roof shingle to form a side-by-side relationship with the second roof shingle; and
wherein the tongue element on the first end edge of the body of the second roof shingle is snapped into the groove on the second side edge of the body of the third roof shingle and the tongue element on the first end edge of the body of the fourth roof shingle is snapped into the groove on the second side edge of the body of the second roof shingle.

* * * * *